July 4, 1967 E. J. LEVY ETAL 3,329,005
DETECTION METHOD AND APPARATUS FOR GAS CHROMATOGRAPHY
Filed Feb. 3, 1964 3 Sheets-Sheet 1

INVENTORS
EUGENE J. LEVY
DONALD G. PAUL
BY

July 4, 1967  E. J. LEVY ETAL  3,329,005
DETECTION METHOD AND APPARATUS FOR GAS CHROMATOGRAPHY
Filed Feb. 3, 1964  3 Sheets-Sheet 3

INVENTORS
EUGENE J. LEVY
DONALD G. PAUL
BY

United States Patent Office 3,329,005
Patented July 4, 1967

3,329,005
DETECTION METHOD AND APPARATUS FOR
GAS CHROMATOGRAPHY
Eugene J. Levy, Cherry Hill, N.J., and Donald G. Paul,
Kennett Square, Pa., assignors, by mesne assignments,
to Hewlett-Packard Company, Palo Alto, Calif., a corporation of California
Filed Feb. 3, 1964, Ser. No. 341,884
24 Claims. (Cl. 73—23.1)

This invention relates to gas chromatography and, more particularly, to a method of and apparatus for compensating for the depletion of a separating column's liquid phase with continued use. A particular feature of this invention is its ability to compensate for the effect of changes in the temperature of a separating column on the detector output signal.

A gas chromatograph is an analytical instrument that is used to separate in time and individually detect the several components of a sample to be analyzed. The gas chromatograph typically includes an analytical column, the inside of which is coated with a liquid stationary phase or packed with a finely divided solid material upon which is dispersed the liquid stationary phase. A carrier gas, or mobile phase, passes continuously through the column. The sample to be analyzed is injected into the carrier gas stream where it is vaporized and swept or carried through the column. The sample constituents are swept through the column at different velocities, depending upon their volatility and their chemical affinity for the liquid stationary phase. In this manner the sample components are separated in time. A detector is employed to detect the several separated constituents and the detector output signal typically is plotted as a function of time to produce what is termed a chromatogram. As each sample component is eluted from the column it produces a sharp increase in the detector output signal amplitude which appears as a peak or spike in the chromatogram.

The temperature of the column may be varied in accordance with a predetermined program to aid in separating the sample components. As the column temperature increases, the vapor pressure of the column's liquid phase, increases such that more of it is swept through the column to the detector. This phenomenon is referred to as "bleeding." The detector responds to this bleeding of the liquid phase to produce an unwanted output signal. When the amplitude of the detector output signal is plotted vs. time (temperature), the unwanted bleed signal produces a rising response characteristic (often termed baseline drift) even in the absence of a sample component. This rising response renders analysis of the chromatogram more difficult to say the least. Even under constant temperature conditions, the normal vapor pressure of the column's liquid phase results in a small amplitude but unwanted bleed signal. In this instance the amplitude of the bleed signal may actually decrease with time.

In an application by Levy et al. entitled "Detection Method and Apparatus for Gas Chromatograph" Ser. No. 299,426 filed Aug. 1, 1963, now Patent No. 3,257,847, a system and method of correcting for this unwanted column bleeding was disclosed. The Levy et al. invention compensates for the unwanted detector response to column bleeding by generating a compensating electrical signal simulating the unwanted bleed signal and subtracting the compensating signal from the detector output signal. This technique has proven quite satisfactory in operation but does not entirely compensate for the small but continued depletion of separating column which has been found to occur due to repeated usage.

Accordingly, it is an object of the present invention to obviate many of the disadvantages caused by column bleeding in prior art gas chromatographs.

Another object of this invention is to provide a novel method of continually compensating for the unwanted response of a gas chromatograph detector to variations in column temperature even over repeated analyses.

An additional object of this invention is to provide an improved apparatus for continually compensating for the effect of column depletion in a gas chromatograph even over successive sample analyses.

In accordance with the method of this invention the unwanted response of a gas chromatograph detector to column bleeding is reduced by generating a compensating electrical signal simulating the unwanted response and subtracting the compensating signal from the detector output signal. As the unwanted response signal varies in amplitude during each sample analysis due to column bleeding, the compensating electrical signal also is varied in amplitude by a decreasing factor of less than one each time the compensated signal bears a predetermined amplitude relationship to the detector output signal. Additionally, the time relationship between the detector output signal and the compensating signal may be varied each time the predetermined relationship exists. At the end of each analysis the compensating signal factor may be returned to unity.

The preferred apparatus for performing the method of this invention includes a function generator to provide the electrical compensating signal whose amplitude varies as a function of column temperature. If the column temperature is varied as a function of time, the compensating signal amplitude may be varied as a function of time. A comparator provides an actuating signal when the amplitude of the compensating signal bears a predetermined relationship to that of the output signal. An analog multiplication circuit is responsive to the actuating signal for reducing the amplitude of the compensating signal by a factor of less than one. In one embodiment of the invention, the multiplication circuit decreases the function generator supply voltage to correct for the effects of column depletion. In another embodiment of the invention, the time or temperature base of the function generator may be stopped in response to the actuating signal.

The novel features that are considered characteristic of this invention are set forth with particularity in the appended claims. The invention itself, however, both as to its organization and method of operation as well as additional objects and advantages thereof will best be understood from the following description when read in connection with the accompanying drawings, in which:

Figure 1:
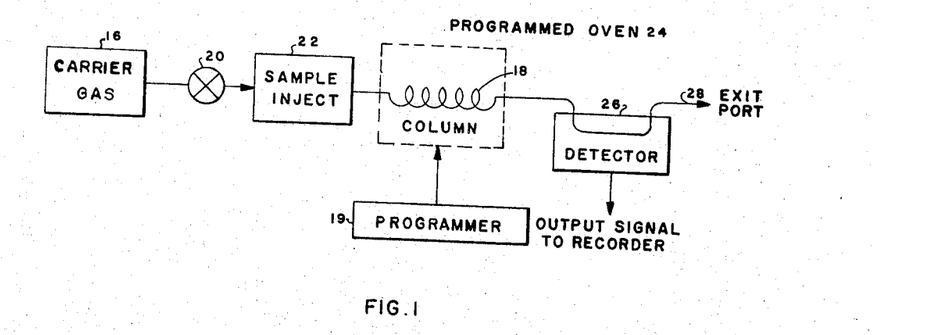
FIGURE 1 is a schematic representation of a typical programmed temperature gas chromatograph.

In FIG. 1 a source of carrier gas 16 is coupled through suitable tubing to an analytical separating column 18. A control valve 20 may regulate the flow of the carrier gas through the column 18. Prior to passage through the column 18 the carrier gas is passed through a sample injector 22 for introducing a gaseous or liquid sample into the column. The column 18 (and sample injector 22) may be enclosed in an oven 24 whose temperature may be varied or regulated in accordance with a predetermined program by a programmer 19. Any suitable programmer which is capable of varying the oven temperature as a function of time or other variable may be used.

From the sample injector 22, the carrier gas and sample, in gaseous or vapor state, pass through the column 18. The column is that part of the chromatograph which separates the sample components. Typically, it comprises a tube filled with an inert solid support material on which is dispersed a liquid, often termed the "liquid phase." This combination of solid support and liquid phase constitutes the packing of a typical gas-liquid chromatograph column. The column length and packing are selected according to sample components to be separated.

A detector 26 is placed at the output of the column 18 to measure any changes in composition of the column effluent. Any suitable gas detector such as a hydrogen flame ionization detector may be used. From the detector 26, the carrier gas and sample components are vented to the atmosphere through an exit port 28. The detector provides an output electrical signal having an amplitude that varies in accordance with the sample components eluated from the column.

Figure 2:
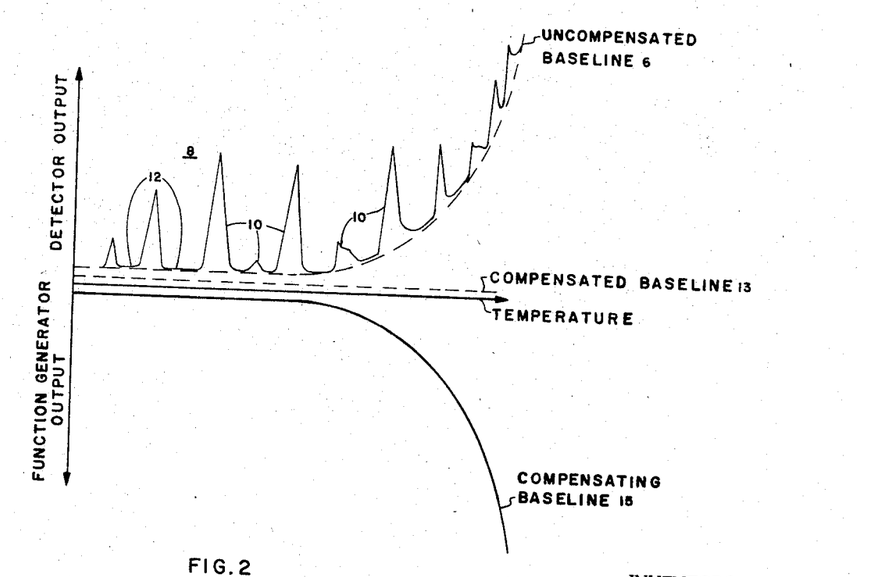
FIGURE 2 includes plots of several different typical output characteristics of a gas chromatograph detector, each plotted as a function of the temperature of the separating column, to illustrate the effects of temperature on column bleeding.

Although the liquid phase is selected to have a low volatility, due to its finite vapor pressure it tends to volatilize or bleed, and be swept along with the volatile sample by the carrier gas out of the column. The bleed rate increases with column temperature and produces an unwanted output signal in the detector 26. This unwanted output signal is illustrated in the plot of FIG. 2 in which the detector output signal amplitude is plotted as a function of column temperature. The resulting curve 6 often is referred to as a bleed-line and actually represents the uncompensated reference or baseline of a typical chromatogram.

Curve 8 illustrates an uncompensated chromatogram in which the individual peaks 10 represent each of the components of the sample. As each of the sample components pass through the detector, the chromatogram peak returns to its reference level or baseline 12 which corresponds to the bleedline 6.

The aforementioned Levy et al. invention provides a relatively simple method of obviating many of the effects of column bleeding. Levy et al. teaches (1) determining the bleed characteristic of a given column, (2) generating an electrical signal simulating this characteristic, and (3) subtracting the generated signal from the actual detector output signal during a sample analysis to reduce baseline drift caused by column bleeding.

Figure 4:
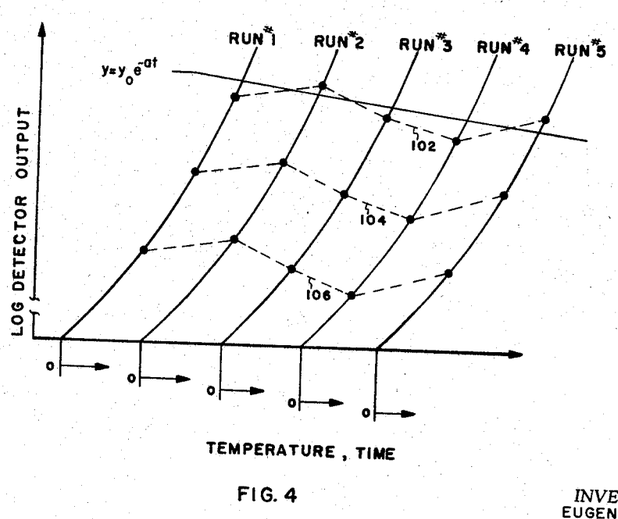
FIGURE 4 is a plot of the bleed characteristics of a particular separating column, with the logarithm of the detector output as the ordinate against temperature or time as the abscissa, over successive chromatograph runs illustrating the phenomenon of bleed level depletion.

Although generally satisfactory, the accuracy of the Levy et al. invention decreased with extended usage of the column due to depletion of the column's liquid phase. It was found that the column depleted itself in an orderly manner as is depicted in FIG. 4 in which typical bleed lines for four successive runs of a chromatograph are illustrated with the logarithm of the detector output signal amplitude plotted against time or column temperature. The bleed characteristic of each run or analysis is generally parallel so as to form a well-defined family of curves (runs 1 to 5). If now three fixed temperature points are selected for each characteristic and like temperature points connected, as by dotted lines 102 for the highest temperature points, 104 for the intermediate temperature points, and 106 for the lower temperature points, it is noted that there is a systematic decrease in bleed level over successive runs. This bleed depletion is generally defined by the empirical equation:

$$y = y_0 e^{-at}$$

where:

$y_0$=initial bleed level of column for a given liquid phase, at a given percent of solid support after a conditioning step and at a given temperature
$y$=bleed level at any time at a given temperature
$a$=constant for a given percent liquid phase dependent on the degree of column conditioning
$t$=time It may be further noted that for any given bleed characteristic most deviations from the systematic depletion rate just described are consistent. If, for example, a particular run has a bleed level higher or lower than that predicted by the bleed depletion equation, that bleed level remains high throughout that run. The converse also tends to be true.

The method of this invention reduces the effects of column bleeding as well as bleed depletion. It comprises the steps of (1) determining the bleed characteristic of a given column, (2) generating an electrical compensating signal simulating this characteristic, (3) subtracting the compensating signal from the actual detector output signal during a sample analysis, and (4) varying the amplitude of the electrical compensating signal by a factor of less than one and/or shifting its time base relative to that of the detector output signal when its amplitude exceeds that of the detector output signal.

The bleed characeristic of a particular column is easily determined after the column has become somewhat stabilized by making a sample run of the chromatograph without a sample. During the sample run, the temperature of the column is varied in accordance with a desired program. By recording the detector output signal variations, an uncompensated baseline characteristic (bleedline) illustrated by curve 6 (FIG. 2) is obtained. A variable function generator may be adjusted to provide a compensating signal simulating the bleedline. The compensating signal may then be used repeatedly to reduce the effects of column bleeding until the column's liquid phase approaches depletion. This is true even though the program rate, and the beginning and ending temperature points are changed.

The effects of liquid phase depletion over successive analyses and the effects of extraneous variations of the detector output signal may be reduced in accordance with this invention by varying the amplitude of the compensating signal by a factor of less than one when the compensating signal amplitude becomes substantially equal to or greater than the detector output signal amplitude. In an alternative method of the invention the function generator itself may be stopped whenever the compensating signal amplitude becomes substantially equal to or greater than the detector output signal amplitude. Both of these methods may be used simultaneously if desired.

Figure 5:
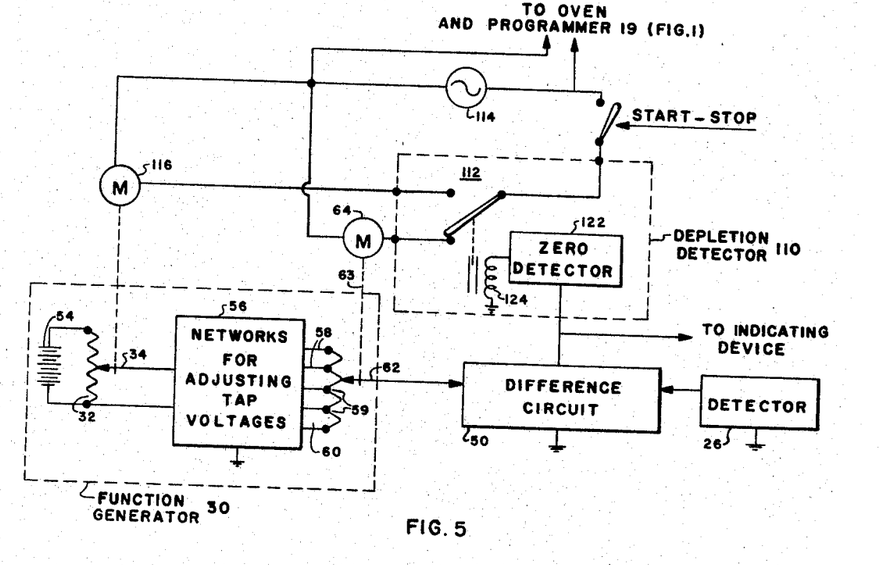
FIGURE 5 is part block and part schematic representation of a preferred apparatus for effecting the method of this invention.

A preferred apparatus for effecting the methods of this invention is illustrated in FIG. 5. In this figure there is shown a function generator, denoted by the dotted rectangle 30, for providing a compensating signal. The output of the function generator 30 is connected to one input of a difference circuit 50. The output of the detector 26 (FIG. 1) is connected to the remaining input of the difference circuit 50. The output of the difference circuit, representing the algebraic sum of its two input signals, may then be connected to a suitable indicating device such as a chart type recorder (not shown) and to the input of a depletion detector 110.

The function generator 30 may comprise a source of D.C. potential such as a battery 54 connected across a potentiometer 32 having a wiper 34. Electrical connections are made to the wiper and one end of the potentiometer to provide an adjustable voltage source for a plurality of adjustable voltage divider networks (illustrated by the rectangle 56). The voltage divided networks 56 provide individually adjustable voltages at each of several outputs 58. Each of these outputs 58 is connected to a different one of the taps 59 of a tapped potentiometer 60 having a wiper 62. The wiper 62 is connected by a suitable mechanical linkage 63 to be positioned along the length of the resistance element of the potentiometer 60 by a constant speed motor 64. A constant speed motor 64 such as a clock motor is used so that the adjustment of potentiometer 60 may be synchronized with the programmer 19 (FIG. 1). The programmer 19 is connected to the A.C. source 114. If desired the wiper 62 may be mechanically linked to the programmer drive to achieve the desired synchronous operation. As the wiper 62 is moved along the potentiometer 60, the voltage between it and either end of the potentiometer resistance element varies as a function of time and the amplitude of the immediately adjacent tap voltages. The output potential available at any tap 59 and hence the voltage output of the function generator 30 varies as a function of the voltage derived from the adjustable voltage source 54–32, i.e., the function signal amplitude may be varied by a factor.

Typical networks that are suitable for generating functions of this type are described, for example, in the book, "Electronic Analog Computors" by Korn and Korn, second edition published 1956 by McGraw-Hill Book Co., on page 321 et seq. By adjusting individual ones of the networks 56, an electrical compensating signal corresponding to any desired function of time is available at the output of the function generator 30.

The difference circuit 50 may be any suitable circuit for effecting the algebraic addition of two electrical signals. The circuit may comprise for example a pair of equal valued resistors connected to a common point which represents the output. In this situation opposite polarity signals are connected to the two inputs which are then effectively subtracted. In the alternative, the difference circuit 50 may take the form of a differential amplifier which type circuits are well known in the art. In the event the detector 26 is a flame ionization type detector, requiring a high input impedance type electrometer amplifier, the algebraic addition may be accomplished in the feedback circuitry of the amplifier using well known techniques. Any suitable means for effecting the algebraic combination of the compensating and detector output signals may be employed as desired to meet the exigencies of the application.

The depletion detector 110 includes a single-pole two-position switch 112 which functions to connect an alternating current source 114 either to a first motor 116, or to a second motor 64. The first motor 116 is linked to the wiper 34 and functions when actuated by switch 112 to reduce the voltage available to the networks 56. By thus reducing the supply voltage, its effect is that of multiplying the function provided by the function generator 30 by a factor of less than one. The second motor 64 provides the time base for the function generator 30 by varying the position of wiper 62 as a function of time.

The depletion detector 110 senses when the compensating signal amplitude equals or exceeds that of the detector output signal and at that point provides an actuating signal, here to relay 124 which switches power from the second motor 64 to the first or voltage reducing motor 116. The first motor 116 continuously reduces the amplitude of the generated electrical signal by a continuously decreasing factor of less than one until such time as the detector output signal amplitude again is substantially equal to or less than the amplitude of the compensating signal. This condition may be sensed electronically by a zero detector 122 or mechanically by a means shown in FIG. 6 The zero detector 122 may be a comparator circuit of suitable type that provides an output actuating signal when its input signal reaches or exceeds a predetermined level. In the case at hand, the reference level for zero detector 122 may be established at that voltage level at which the recorder pen is one scale division below zero. As illustrated, the output of the zero detector may be connected to the energizing coil of relay 124 which when energized operates the arm of switch 112 to its upper position in the drawing to disconnect the second motor 64 and connect the first motor 116 to the A.C. source 114.

Simultaneously with the reduction in compensating signal amplitude, the second motor 64 delays the time base of the compensating signal relative to that of the temperature program such that its amplitude remains at a fixed level. In the meantime, the detector output signal continues its normal increase in amplitude due to column bleeding with increasing temperature until it again approaches the amplitude of the compensating signal at which point the zero detector 122 de-energizes the first motor 116 and again energizes the second motor 64.

Figure 3:
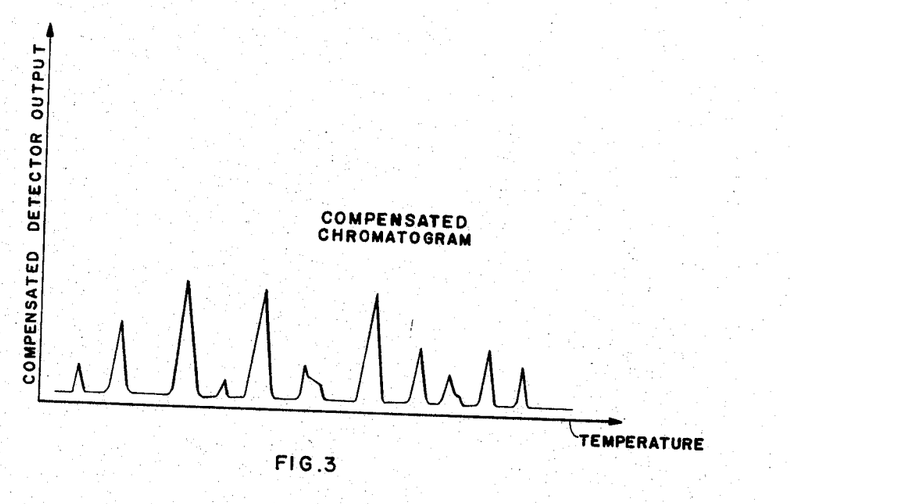
FIGURE 3 is a typical detector output signal (detector output vs. temperature) which has been compensated in accordance with this invention for the effects of column bleeding.

This method and apparatus has the particular advantage of permitting the detector output signal to represent the eluted sample components and yet due to the analog compensating signals which approximate the bleed characteristic, its excessive bleed is reduced substantially to zero. If at any time the compensating signal amplitude exceeds that of the detector output signal, as would be the case resulting from bleed level depletion over successive runs of a particular column, the depletion detector 110 reduces the compensating signal amplitude by a continually decreasing factor and simultaneously delays the time base of the function generator such that the generated compensating signal no longer increases in amplitude with time. This condition prevails until the detector output signal again approaches the amplitude of the compensating signal at which time the function generator's time variable is again actuated. This corrective action may occur at many points during a particular run and will occur each time the compensating signal equals or exceeds the amplitude of the detector output signal by more than a predetermined amount such that the recorder pen is driven below its zero line. The compensated output illustrated in FIG. 3 thus has a relatively flat baseline characteristic which facilitates the analysis of the sample components. It has the particular advantage of correcting for vagaries in the system operation caused for example by programmer errors, etc.

Although not shown in the drawing the apparatus should include suitable clutching mechanisms in the motors 64 and 116 to permit the respective wipers 34 and 62 to be returned after each run to their starting positions. This may also be accomplished by suitable reversing switches on the motors. Also while it is desirable that the function generator 30 provide a function signal closely approximating the column bleed characteristic after the column has been suitably conditioned, in many instances satisfactory results may be obtained by replacing the networks 56 and potentiometer 60 with a nonlinear potentiometer. The wiper displacement-resistance characteristic of the nonlinear potentiometer should desirably be selected to approximate the bleed characteristic. The function generator 30 may be, if desired, a suitable electronic system that does not require the use of mechanical drives.

Figure 6:
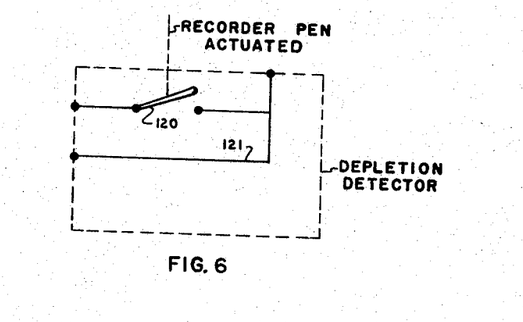
FIGURE 6 is a schematic representation of a modification of the apparatus illustrated in FIG. 5 that may be used to perform the method of this invention.

In still another embodiment of the invention the depletion detector 110 may be modified as illustrated by FIG. 6 to energize the first motor 116 without de-energizing the second motor 64, even though the compensating signal amplitude exceeds that of the detector output signal. The embodiment of FIG. 6 may be substituted for the dotted rectangle 110 illustrated in FIG. 5. In FIG. 6 the depletion detector 110 includes a micro-switch 120 adapted to be actuated or tripped by the recorder pen movement. The micro-switch 120 may be positioned to close as the recorder pen, say, is displaced to a position of more than one scale division below zero, i.e., when the compensating signal amplitude exceeds that of the detector output signal. Closure of the micro-switch 120 energizes the voltage reducing motor 116 to decrease the compensating signal amplitude by a continually decreasing factor, as described. In this instance the output of the difference circuit is not connected to the depletion detector 110. In either this embodiment of the invention or that illustrated in FIG. 5, the time base of the compensating signal may be left undisturbed by maintaining the second motor continuously energized through line 121. This embodiment is particularly useful in conjunction with columns which create irregularities in the detector output signal such as to increase its amplitude.

Figure 7:
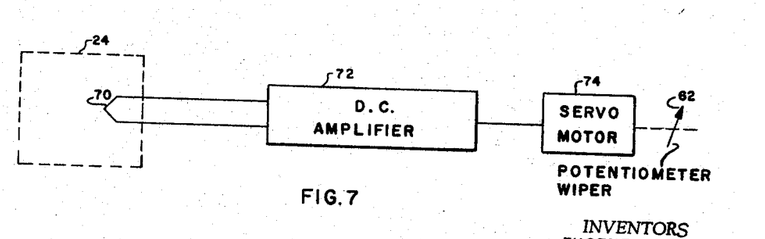
FIGURE 7 is a partial block diagram of still another apparatus that may be used to perform the method of this invention.

Another embodiment of this invention is shown in FIG. 7. In the embodiment of FIG. 7, the function generator 30 (FIG. 1) provides an electrical output signal whose independent variable is temperature rather than time. The temperature of the oven 24 (FIG. 1) is detected by a thermocouple 70. The output of this thermocouple 70 is connected to a suitable D.C. amplifier 72, the output of which may drive a servo motor 74 for positioning the potentiometer wiper 62 in the function generator 30 (FIG. 5). The embodiment shown in FIG. 7 has a particular advantage in that the output signal is generated strictly as a function of oven temperature (and hence of column temperature) and thereby compensates for any fluctuations which may occur between the programmed and actual temperatures. As is known, the oven temperature may not always follow precisely the programmed temperature. The embodiment of FIG. 7 also may find use in those applications not necessarily involving a programmed temperature operation but in which the environment of the chromatograph is such that its column temperature may be subjected to certain repeatable variations.

If desired the motor 64 may be a unidirectional servomotor driven at a rate proportional to the amplitude of the difference signal from the difference circuit 50. This arrangement has the advantage of more rapidly correcting for bleed. Additionally the invention may be used with dual column chromatographs wherein complete compensation is not possible due, for example, to a mismatch between the reference and analytical columns.

There has thus been described a novel method and apparatus for reducing the effects of column bleeding on the detector output signal of a gas chromatograph. This method and apparatus has a particular advantage in that only a single column is required to provide sample analyses having a relatively flat baseline response characteristic even under programmed temperature operation. It also has the advantage that column liquid phase depletion and other variables which cause variations in the bleed level of a column over successive runs are automatically and simply compensated for.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:
1. In a gas chromatograph having a separating column and a detector for providing an output electrical signal whose amplitude varies in accordance with the composition of the effluent from the column, said column having a liquid phase which volatilizes as a function of column temperature thereby producing unwanted variations in the detector output signal amplitude, the combination of means for generating an electrical compensating signal having an amplitude that varies as a function of temperature in substantially the same manner as the temperature-produced amplitude variations in said detector output signal, means for combining said compensating signal and said detector output signal thereby to produce a compensated detector output signal substantially free from the unwanted variations, and means for varying the amplitude of said compensating signal by a factor of less than one when the compensating signal amplitude obtains a predetermined relationship to that of the detector output signal.

2. The combination set forth in claim 1 wherein the varying means continuously decreases said factor in a linear manner.

3. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, and means for varying the amplitude of the compensating signal by a factor of less than one when its amplitude bears a predetermined relationship to that of the detector output signal.

4. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, means for varying the amplitude of the compensating signal by a factor of less than one when its amplitude bears a predetermined relationship to that of the detector output signal, and means coupled to the amplitude varying means for continuously decreasing said factor, said predetermined relationship being when the compensated signal amplitude is equal to or greater than that of the detector output signal.

5. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, means for varying the amplitude of the compensating signal by a factor of less than one when its amplitude bears a predetermined relationship to that of the detector output signal, and means for simultaneously therewith delaying the time variable of the compensating signal relative to the detector output signal when the compensating signal amplitude obtains a predetermined relationship to that of the detector output signal.

6. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector signal, means for combining the compensating signal and the detector output signal thereby to produce a compensated detector output signal substantially free from the unwanted amplitude variations, means for varying the amplitude of the compensating signal by a factor of less than one when its amplitude bears a predetermined relationship to that of the detector output signal, means for simultaneously therewith delaying the time variable of the compensating signal relative to the detector output signal means for continuously decreasing said factor, said predetermined relationship to that of the detector output signal, and means coupled to the amplitude varying means for continuously decreasing said factor, said predetermined relationship being when the compensated signal amplitude is equal to or greater than that of the detector output signal.

7. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, and means for simultaneously therewith delaying the time variable of the compensating signal relative to the detector output signal when the compensating signal amplitude obtains a predetermined relationship to that of the detector output signal.

8. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when said predetermined relationship exists, and means responsive to said actuating signal for varying the amplitude of the compensating signal by a factor of less than one.

9. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal ampiltude, means responsive to said detecting means for providing an actuating signal when said predetermined relationship exists, means responsive to said actuating signal for varying the amplitude of the compensating signal by a factor of less than one, and means coupled to the amplitude varying means for continuously decreasing said factor during the presence of said actuating signal.

10. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when said predetermined relationship exists, and means responsive to said actuating signal for simultaneously therewith delaying the time variable of the compensating signal relative to real time.

11. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when said predetermined relationship exists, means responsive to said actuating signal for varying the amplitude of the compensating signal by a factor of less than one, and means responsive to said actuating signal for simultaneously therewith delaying the time variable of the compensating signal relative to real time.

12. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and ouput signals for detecting when the compensating signal amplitude bears a predetermined relationship to the detector output signal amplitude, means responsive to said detecting means for providing an actuating signal when said predetermined relationship exists, means responsive to said actuating signal for varying the amplitude of the compensating signal by a factor of less than one, means responsive to said actuating signal for simultaneously therewith delaying the time variable of the compensating signal relative to real time, and means coupled to the amplitude varying means for continuously decreasing said factor in the presence of said actuating signal.

13. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when said predetermined relationship exists, means responsive to said actuating signal for varying the amplitude of the compensating signal by a factor of less than one, and means responsive to said actuating signal for simultaneously therewith delaying the time variable of the compensating signal relative to real time, said generating means including a variable impedance network, said amplitude varying means including a source of potential and a potentiometer having a resistance element connected across said source and a wiper, said network being connected between one end of said element and said wiper, and an electrical motor responsive to said actuating signal for positioning said wiper along said element toward said one end, thereby to continuously reduce the compensating signal amplitude by said factor.

14. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when said predetermined relationship exists, means responsive to said actuating signal for varying the amplitude of the compensating signal by a factor of less than one, and means responsive to said actuating signal for simultaneously therewith delaying the time variable of the compensating signal relatve to real time, said time variable delaying means including a potentiometer having a tapped resistance element to which taps are applied different potentials and a wiper, said resistance element being connected across the output of said generating means, an electric motor means for positioning said wiper along said resistance element, and means responsive to said actuating signal for disabling said motor.

15. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector ouput signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when sad predetermined relationship exists, and means responsive to said actuating signal for varying the amplitude of the compensating signal by a factor of less than one, said detecting means comprising means responsive to said compensated detector output signal for determining when it reverses polarity.

16. In a gas chromotograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when said predetermined relationship exists, and means responsive to said actuating signal for varying the amplitude of the compensating signal by a factor of less than one, said detecting means including a recorder having a moving pen having a displacement proportional to the amplitude of said compensated signal, and a mechanical switch adapted to be closed upon said pen achieving a predetermined displacement, said switch connecting said actuating signal means to said amplitude varying means.

17. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when said predetermined relationship exists, and means responsive to said actuating signal for simultaneously therewith delaying the time variable of the compensating signal relative to real time, said detecting means comprising means responsive to said compensated detector output signal for determining when it reverses polarity.

18. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when said predetermined relationship exists, and means responsive to said actuating signal for simultaneously therewith delaying the time variable of the compensating signal relative to the detector output signal, said detecting means includes a recorder having a moving pen having a displacement proportional to the amplitude of said compensated signal, and an electrical switch adapted to be closed upon said pen achieving a predetermined displacement, said switch connecting said actuating signal means to said time delaying means.

19. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when said predetermined relationship exists, means responsive to said actuating signal for varying the amplitude of the compensating signal by a factor of less than one, and means responsive to said actuating signal for simultaneously therewith delaying the time variable of the compensating signal relative to the detector output signal, said predetermined relationship existing when said compensated detector output signal reverses polarity.

20. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the combination of means for generating an electrical compensating signal having an amplitude-time characteristic simulating the unwanted amplitude variations in the detector output signal, means for combining the compensating signal and the detector output signal thereby to produce a compensated detector output signal substantially free from the unwanted amplitude variations, detecting means responsive to each of said compensating and output signals for detecting when the compensating signal amplitude bears a predetermined relationship to the detector output signal amplitude, means responsive to said detecting means for providing an actuating signal when said predetermined relationship exists, means responsive to said actuating signal for varying the amplitude of the compensating signal by a factor of less than one, and means responsive to said actuating signal for simultaneously therewith delaying the time variable of the compensating signal relative to the detector output signal, said detecting means includes a recorder having a moving pen having a displacement proportional to the amplitude of said compensated signal, and an electrical switch adapted to be closed upon said pen achieving a predetermined displacement, said switch connecting said actuating signal means to said amplitude varying means.

21. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the method of compensating for said unwanted variations over successive chromatograph runs comprising the steps of generating an electrical compensating signal having an amplitude-time characteristic simulating the unwanted detector output signal amplitude variations, and algebraically subtracting said compensating signal from said detector output signal thereby to produce a compensated detector output signal substantially free from the unwanted amplitude variations, and reducing the amplitude of the compensating signal by a factor of less than one when its amplitude bears a predetermined relationship to that of the detector output signal.

22. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the method of compensating for said unwanted variations over successive chromatograph runs comprising the steps of generating an electrical compensating signal having an amplitude-time characteristic simulating the unwanted detector output signal amplitude variations, and algebraically subtracting said compensating signal from said detector output signal thereby to produce a compensated detector output signal substantially free from the unwanted amplitude variations, and reducing the amplitude of the compensating signal by a factor of less than one when its amplitude bears a predetermined relationship to that of the detector output signal, and varying the time relationship between the compensating signal and the detector output signal when the compensating signal amplitude bears a predetermined relationship to the amplitude of the detector output signal.

23. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the method of compensating for said unwanted variations over successive chromatograph runs comprising the steps of generating an electrical compensating signal having an amplitude-time characteristic simulating the unwanted detector output signal amplitude variations, and algebraically subtracting said compensating signal from said detector output signal thereby to produce a compensated detector output signal substantially free from the unwanted amplitude variations, and varying the time relationship between the compensating signal and the detector output signal when the compensating signal amplitude bears a predetermined relationship to the amplitude of the detector output signal.

24. In a gas chromatograph having a separating column and a detector for providing an output electrical signal whose amplitude varies in accordance with the composition of the effluent from the column, said chromatograph having means for varying the temperature of the column as a predetermined function of time, the column having a liquid phase which volatilizes as a function of column temperature thereby producing unwanted variations in the detector output signal amplitude, the method of compensating for said unwanted variations over successive chromatograph runs comprising the steps of varying the temperature of said column as a predetermined function of time, measuring the variations in detector output signal amplitude occurring as a function of the temperature variations, generating an electrical compensating signal having an amplitude-time characteristic simulating the unwanted detector output signal amplitude variations, and algebraically subtracting said compensating signal from said detector output signal thereby to produce a compensated detector output signal substantially free from the unwanted amplitude variations, and reducing the amplitude of the compensating signal by a factor of less than one when its amplitude bears a predetermined relationship to that of the detector output signal.

References Cited
UNITED STATES PATENTS 3,228,230 1/1966 Thiele _____________ 73—23.1 X
2,257,847 6/1966 Levy et al. __________ 73—23.1

JAMES J. GILL, *Acting Primary Examiner.*

C. A. RUEHL, *Assistant Examiner.*